United States Patent Office 3,538,010
Patented Nov. 3, 1970

3,538,010
LIQUID ION-EXCHANGER COMPOSITION CONTAINING BORON OXIDE AND AN ALKALI METAL OXIDE
Monte H. Rowell, 1520 Everett St., El Cerrito, Calif. 94530
No Drawing. Original application July 27, 1964, Ser. No. 385,519, now Patent No. 3,337,306, dated Aug. 22, 1967. Divided and this application July 17, 1967, Ser. No. 663,467
Int. Cl. B01j *1/04;* C09k *3/00*
U.S. Cl. 252—182         7 Claims

ABSTRACT OF THE DISCLOSURE

Liquid ion-exchanger composition adapted for use at temperatures ranging from 750° C. to 1400° C. Ion exchange between two liquid phases is accomplished by placing the ion-exchanger composition in contact with a fused salt with which it is immiscible, separating the two phases when the desired exchange of cations has taken place, and recovering the exchanged ions from the fused glass phase.

---

The invention described herein may be manufactured and used by or for the Government of the United States of America for governmental purposes without the payment of any royalties thereon or therefor.

The present invention is a division of patent application Ser. No. 385,519, filed July 27 1964, and now Pat. No. 3,337,306 issued Aug. 22, 1967 and relates to a high-temperature liquid-liquid extraction process and particularly to such a liquid-liquid extraction process which is peculiarly adapted for use with ionic melts such as "molten salts" (sometimes referred to as "fused salts") or any other liquids which are stable at the high temperature levels which characterize molten or fused salts.

Liquid-liquid extraction, per se, is established in the art and in general terms involves two liquid phases which are in contact with each other and which are substantially immiscible with respect to each other. Based upon such diverse mechanisms as (a) "preferential solubility" or (b) "ion exchange" across the interface between the two liquid phases, various solutes will assume a preferential distribution within the one liquid phase or the other, which, in turn, is the key to the particular "extraction" sought. The overall obective of the "extraction" process may be to separate various solutes from one another, to remove various solutes from the material(s) representing one of the two immiscible liquid phases, to purify the material representing one of such liquid phases, or some other like purpose attainable with the given liquid-liquid extraction process.

Prior liquid-liquid extraction processes generally have involved liquid-liquid extraction between aqueous systems and organic solvents. These prevailing liquid-liquid extraction processes can be regarded as generally "water or aqueous" systems, that is, one of the immiscible conjugate liquid phases is or contains water. In contradistinction to aqueous systems, a non-aqueous solvent system which recently has attracted widespread interest is one which involves other liquids referred to as "molten salts" or "fused salts." A fused or molten salt, sometimes referred to as an "ionic melt," may be thought of as a "fluid of ions." Although the fused salt is a liquid which may appear like water, chemistry in fused salts is substantially different from chemistry in water and is characterized by many advantages not present in an aqueous system. For instance, there is a much greater concentration of ions in a fused salt than in an aqueous system. Also, fused or molten salts involve much higher temperatures and, accordingly, are much more highly chemically reactive. (It is a "rule of thumb" that for every 10° rise in temperature there is a doubling of chemical reaction rate.) Still another significant advantage of fused salts over aqueous systems is that there are many instances when things will dissolve readily in fused salts though they are very insoluble in water. Therefore these materials are much more easily put into solution in a fused salt system than in an aqueous system.

The liquid-liquid extraction process of the present invention appears to rest primarily upon the mechanism of "ion exchange" of particular significance it incorporates a liquid ion-exchanger which is stable at high enough temperatures (up to 1400° C.) to be generally employable with fused salts. There has been a previously-developed solvent extraction of fused salts which involved tributyl phosphate and a mixture of low melting alkali nitrates, but the liquid-liquid extraction process involved can be employed only with low-temperature fused salts which do not exceed aobut 300° C. in temperature. In contrast, the liquid-liquid extraction process of the present invention can be employed with fused salts to a temperature of about 1400° C. Another very significant distinguishing feature of the liquid-liquid extraction process of the present invention is that the one liquid phase thereof, which coacts with the fused salt constituting the other liquid phase of the extraction process, is immiscible with many fused salts. Since immiscibility of the two conjugate liquid phases is a cardinal requirement of any given liquid-liquid extraction process, this broad-range immiscibility with respect to fused salts endows the present extraction process with a very wide range of applicability.

Turning now, with particularity, to a specific embodiment of the present invention, the liquid-liquid extraction takes place between an ionic melt, such as a fused salt, as one liquid phase and a fused borate glass as the other phase of the extraction process. The fused salt phase can consist of any of the wide variety of fused salts with which the fused borate glass phase is immiscible. Preferably, the fused borate glass phase acts as a liquid ion-exchanger and is formulated in the embodiment by a combination of (1) an alkali oxide generically designated by the formula $M_2O$ where O is oxygen and M is any of the alkali metals such as sodium (Na), potassium (K), etc. and (2) boron oxide ($B_2O_3$). This $M_2O_3$ system forming the preferred borate glass liquid phase of the present extraction process can take any combination of the above-cited constituents within the limits set forth in the following Table I wherein the amounts are specified in mole percent:

TABLE I $M_2O$—a fraction of 1%–40%

$B_2O_3$—60%–almost 100%

Within these limits specified above in Table I, the most useful composition range for separations based upon the ion exchange mechanism of selectivity is as specified in the following Table II which also is in terms of mole percent:

TABLE II $M_2O$—15%–33%

$B_2O_3$—67%–85%

Optimum results are exhibited where sodium (Na) is the metal (M) employed in the formulation. Sodium (Na) and potassium (K) will generally be preferred because of their greater availability. However, it is not necessary that the cations of the salt and exchanger be alkali ions. Other possible cations include $Cu^+$, $Cu^{++}$, $Ag^+$, $Zn^{++}$, $Cd^{++}$, $Hg^{++}$, $Hg^+$, $Tl^+$, $Sn^{++}$, $Al^{+++}$, and Pb⁺⁺. Alkaline earths may be employed at higher temperatures, i.e. temperatures high enough to melt their borates. The essential conditions are that (a) the borates of the cations should form two immiscible liquid phases at the same temperatures, and (b) they should be replaceable from the borate network.

The maximum affinity of the fused borate glass phase (ion-exchanger) for most of the highly charged ions occurs within the formulation ranges set forth in Table III below. Maximum separation factors between chemically-similar items also would usually occur within these Table III ranges.

TABLE III $M_2O$ (alkali oxide)—25–30 mole percent
$B_2O_3$—70–75 mole percent

In this borate glass liquid phase is formed a boron-oxygen network (to be described in detail, infra). The constitutent formulation or substitution of this phase, as described above in Tables I, II, and III can be modified by the addition of other elements which form glassy polymeric networks with oxygen such as silicon (Si) and phosphorous (P). Such elements may also be employed as partial substitutes for boron (B) in the given phase formulation. Such substitutional replacement of boron (B) in this borate glass phase can only be partial and not complete, for the presence of boron (B) in this phase is critical to the extraction process of the invention. As far as the effectiveness of the extraction is concerned, it is not necessary to replace any of the boron (B) in this borate glass phase with any of these other possible partial substitutes. Boron (B) presently offers the optimum properties relative to the general extraction effectiveness. However, the empolyment of silicon (Si) or phosphorous (P) may be desirable with a view toward shifting certain of the physical characteristics (melting point, solubility etc.) of this borate glass phase. For instance, the addition of silicon (Si) will generally raise the melting point of the phase and decrease its solubility. Both of the constituents of the $M_2O$-$B_2O_3$ system which comprise the borate glass phase are in the fused state. There is nothing critical about the formulation procedure. $M_2O$ and $B_2O_3$ may be melted prior to being added together or thereafter.

This fused borate glass liquid phase can be employed with any molten salt or mixture of molten salts which is compatible with the glass phase at the temperature used, that is, that, at the temperature involved, the borate glass liquid phase and the fused salt liquid phase are immiscible with respect to each other and are both stable. There is no criticality with respect to the relative amounts of the fused borate glass phase and the fused salt phase except that there must be a sufficient amount of each phase present to exceed that amount which is necessarily lost to the other phase through mutual solubility.

So far the discussion herein has been directed mainly to liquid-liquid extraction in general terms and to the make-up of the two conjugate liquid phases which comprise the high temperature liquid-liquid extraction process defined herein. This discussion will now be directed to an explanation of the operation of the extraction process of the invention.

The extraction process appears predicated principally upon ion exchange between the two liquid phases described above (i.e., between the fused borate glass phase and the fused salt phase), ion exchange, as is known, being based on a greater chemical affinity in the one phase for ions present in the other phase. The result is that such attracted ions will migrate across the interface of the two phases and assume a preferential distribution in the attracting phase. In general terms, the attracting or "extracting" phase is the fused borate or "exchanger" phase while the phase which relinquishes ions or solutes, as they are more generically termed, is the "co-phase" or fused salt phase. As "attracted" ions migrate across the interface and assume their preferential distribution in the extracting (fused borate phase), they are replaced in the co-phase by other ions which were originally in the extracting phase. The degree of preferential distribution of a given solute in the fused borate phase is measured in terms of what is called its "distribution coefficient" $K_d$.

$K_d$ (for a given solute) =

$$\frac{\text{molal concentration (of the solute)}}{\text{molal concentration (of the solute)}}$$
$$\frac{\text{in the borate phase}}{\text{in the fused salt phase}}$$

The extraction process of the invention is founded upon this fact of preferential distribution of given solutes in the fused borate liquid phase (based primarily on the mechanism of ion exchange) coupled with the additional circumstance that chemically similar elements such as, for example, Ba, Ca and Sr have relatively large differences in their distribution coefficients ($K_d$). There also is variation in the distribution coefficient ($K_d$) of each solute with variation in the composition of the fused borate phase, thereby adding still greater versatility to the extraction process. Large changes in the distribution coefficients of the solutes are possible by changing the oxide composition of the $M_2O$-$B_2O_3$ system.

$B_2O_3$ is believed to form a polymeric network of B and O atoms. If the so-called fused borate phase of the extraction process of the invention consisted solely of pure molten $B_2O_3$ there would be a distribution of solutes in the two conjugate liquid phases which would be based only upon preferential solubility. $B_2O_3$, by itself, will not induce an ion exchange between the fused borate phase and the fused salt phase, but will show preferential solubility toward lesser charged and uncharged species. The addition to the $B_2O_3$ polymeric network of a modifier consisting of an oxide of one of the alkali metals (preferably either $Na_2O$ or $K_2O$) converts the $B_2O_3$ network to a highly-effective "ion exchanger." For most solutes, the ion-exchanger reaches its maximum effect at 25–30 mole percent alkali oxide. When this alkali oxide is added to the system, the oxygen of the alkali oxide enters the boron-oxygen network largely by covalent bonding, leaving each alkali ion relatively mobile. Negatively charged sites are produced in the borate network by the inclusion of added oxygen. Definied below are a pair of functional groups of this borate network with the negatively charged site in each functional group being generally indicated by a negative sign encircled in dotted lines, such as ⊖:

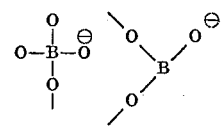

One of the mobile alkali ions, each of which has a positive charge, will assume a position in the vicinity of each of these negatively charged sites in the borate network to neutralize the negative charge of each of the charged sites. Below is a representation of each of the charged sites (noted above) in conjuction with its accompanying alkali ion M⁺, designated with a positive charge shown thusly ⊕:

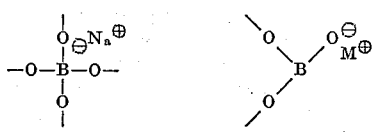

This molten borate glass network has been found to contain only the two functional groups noted above and is believed to be a three-dimensional network comprising interlinked functional groups as shown with their associated alkali cations. The showing below is representative of the comprehensive network:

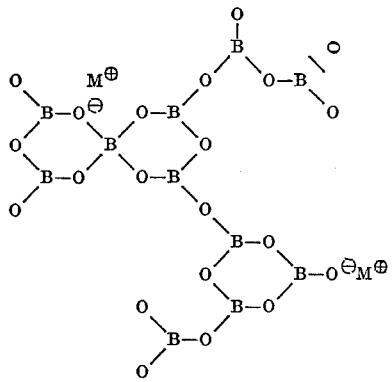

The alkali-modified borate glass network constitutes the fused borate glass liquid phase which coacts with its conjugate ionic melt or fused salt liquid phase to accomplish the liquid-liquid extraction of the invention. The alkali-modified borate glass network acts principally as an ion-exchanger—exchanging the alkali ion $M^+$ for other cations which are originally present in the ionic melt or fused salt liquid phase. The alkali-modified borate glass network in effect acts as a "captor network" "capturing" cations from the ionic melt or fused salt phase and giving up alkali metal cations $M^+$ in exchange therefor. The relinquishment of the alkali metal $M^+$ cations in exchange for the captured cations from the ionic melt or fused salt phase is a result of obedience of the ion exchange process to the law of electrical neutrality.

The captor network of the fused borate glass phase does not exchange its alkali cations for all cations in the ionic melt or fused salt phase with the same degree of preference. This captor network captures given cations from the ionic melt or fused salt phase according to the "field strength" and other properties of the given cation involved. "Field strength" of the given cation is directly proportional to its charge and inversely proportional to the outer radius of the cation. In accordance with this preferential chemical affinity for cations which is predicted largely upon cation field strength, the captor network of the molten borate glass phase will attract a cation "A," which has a like charge to cation "B" but with less ion radius than cation "B," before it will attract cation "B." The alkali ion $M^+$, for which the captor network has little chemical affinity when there are "competitive" ions available, will be readily replaced at its "exchange site" (the network site where a "network-captured" ion replaces an alkali ion $M^+$) in the borate glass network by the network-preferred cation which has migrated across the phase interface from the ionic melt or fused salt phase into the fused borate glass phase. Stated in terms of distribution concentration, with fused borate glass as the one liquid phase of the extraction process and the ionic melt or fused salt as the other liquid phase thereof, the distribution coefficient $K_d$ is low for the alkali metals. The cations which migrate from the fused salt or ionic melt phase to be trapped at the exchange sites of the fused borate network are generally held by the captor network by ionic bonding (i.e., by coulombic forces), although a relatively fewer number may be held by covalent bonding.

The mechanism of ion exchange, while extremely important, is not the only factor influencing the distribution of solutes between phases. In addition to cations attracted to functional groups in the borate phase there will be other cations along with their corresponding anions dissolved in the borate phase, due to the considerable solubility of liquid salt in the liquid borate. The solubility of salt in the borate phase increases with increasing alkali oxide content. This solubility is analogous to the well-known phenomenon with organic resin ion exchangers known as "electrolyte invasion." At low-alkali compositions the borate phase exhibits preferential solubility toward uncharged species and finds ionic species more repulsive the higher the field strength. Addition of alkali oxide reverses the latter tendency and diminishes the former tendency. Thus for each solute species there is a characteristic manner in which $K_d$ value changes with alkali oxide content. The extreme magnitude of these $K_d$ value changes and their variability according to solute are the basis for separations.

Chemically similar elements such as, for example, Ba, Ca, Sr have been found to have relatively large differences in their distribution coefficients ($K_d$). Having such a marked preferential attraction separation is made a practical reality.

The ability to further vary the given distribution coefficients of the particular solutes by varying the composition of the fused borate phase adds still another dimension to the versatility of the process and the capability of separating elements from one another, even though they may have close chemical similarity. To illustrate the degree of controlled preferential attraction attainable by the ion-exchanging fused borate phase, a separation factor of 2:1 is attainable by the invention between the respective rate earth elecents europium and neodymium which are characteristically considered extremely difficult of separation from one another. The respective distribution ratios (between the ion-exchanger phase and the fused salt phase) are 2000:1 for neodymium and 4000:1 for europium.

The Table II and III formulation ranges have been discussed above in terms of the ion-exchange mechanism upon which they are principally predicated. Other compositions falling within the broader limits defined by Table I may be useful for separation of solutes whose distribution depends largely or partly on other mechanisms such as "preferential solubility." For example, neutral species (nonionic) or anionic species (negatively charged) may be separated from cations in most any composition region. The low-alkali region is useful in practical application in making back-extraction (removing solutes from the borate phase). For example, at 20% $Na_2O$ content, rare earths such as Nd or Eu have $K_d$'s of about 100. By doubling the $B_2O_3$ content the $Na_2O$ content becomes 10% and the $K_d$ is reduced to about 0.1, allowing removal of this ion to the salt phase.

$$\left(K_d = \frac{\text{molal concentration of solute in borate phase}}{\text{molal concentration of solute in ball phase}}\right)$$

Ion separations may be effected not only by virtue of selectivity of cations based upon relative field strength but also by the fact that certain ions such as transition metal ions may from polyatomic cations, neutral species, or anions. For example a cation $M^{+++}$ in a halide salt (halide ion=$X^-$) may be present as $M^{+++}$, $MX^{++}$, $MX_2^-$, $MX_3$ (neutral), $MX_4^-$ etc. $Fe^{+3}$ does this:

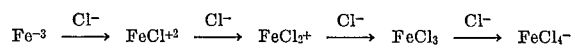

When such "glass-formers" as Si or P are added to the fused borate glass phase or are partially substituted for the boron although their precise mechanism-of-action is not known, it is considered that they probably participate in the same manner as boron in that they can be a part of the various functional groups. These other glass-formers such as Si or P may be incorporated into or substituted for the boron-oxygen network as long as only the two stable liquid phases of the invention process result.

With the highly-controllable "preferential distribution ratios" and "separation factors" available with the extraction process of the invention and the ability of the extraction process to be employed at temperatures up to 1400° C. and with a wide range of fused salts with which the ion-exchanger or fused borate phase is immiscible, it readily can be seen that the extraction process of the invention represents a vast improvement in the field of liquid-liquid extraction.

In the formulations set out supra, M₂O, as well as being any alkali oxide, can also be any combination of alkali oxides.

It is also to be pointed out, by way of variation possibilities, that borate glasses can function as solid ion-exchangers, as well as in the form of liquid ion-exchangers. The borate glass phase herein is generally preferable in the liquid state as defined above, for the formation of a solid borate glass phase in the borate ion-exchanger may slow its rate of exchange.

What is claimed is:

1. A liquid ion-exchanger, which is stable at temperatures up to 1400° C. and which is employable as the conjugate liquid phase with a fused salt phase in a liquid-liquid extraction process, consisting essentially of a molten formulation of from a fraction of a molar percent to about 40 molar percent of an alkali metal oxide and from about 60 molar percent to almost 100 molar percent of boron oxide.

2. A liquid ion-exchanger, which is stable at temperatures up to 1400° C. and which is employable as the conjugate liquid phase with a fused salt phase in a liquid-liquid extraction process, consisting essentially of a molten formulation of from about 15 to about 33 molar percent of an alkali metal oxide and from about 67 to about 85 molar percent of boron oxide.

3. The liquid ion-exchanger of claim 1 wherein said alkali metal oxide is sodium oxide.

4. The liquid ion-exchanger of claim 2 wherein said alkali metal oxide is sodium oxide.

5. The liquid ion-exchanger of claim 2 wherein said ion-exchanger further comprises a selected amount of silica, the amount of silica selected being that amount which will adjust the melting point or adjust the mutual solubility of said ion-exchanger and said salt phase to the point desired.

6. The liquid ion-exchanger of claim 2 wherein said ion-exchanger further consists essentially of a selected amount of phosphor, the amount of phosphor anhydride selected being that amount which will adjust the melting point or adjust the mutual solubility of said ion-exchanger and said salt phase to the point desired.

7. A liquid ion-exchanger, which is stable at temperatures up to 1400° C. and which is employable as the conjugate liquid phase with a fused salt phase in a liquid-liquid extraction process, consists essentially of a molten formulation of from about 25 to about 30 molar percent of an alkali metal oxide and from about 70 to about 75 molar percent of boron oxide.

References Cited

UNITED STATES PATENTS 3,245,031  6/1966  De Paolis et al. _____ 252—301

LEON D. ROSDOL, Primary Examiner

I. GLUCK, Assistant Examiner

U.S. Cl. X.R.

23—312; 210—38; 252—179